US005659748A

United States Patent [19]
Kennedy

[11] Patent Number: 5,659,748
[45] Date of Patent: Aug. 19, 1997

[54] BOOTING OF MULTIPROCESSOR SYSTEM FROM A BOOT ROM OF NARROWER WIDTH THAN THE SYSTEM MEMORY

[75] Inventor: Barry Kennedy, Santa Ana, Calif.

[73] Assignee: AST Research, Inc., Irvine, Calif.

[21] Appl. No.: 485,111

[22] Filed: Jun. 7, 1995

Related U.S. Application Data

[63] Continuation of Ser. No. 52,818, Apr. 26, 1993, Pat. No. 5,450,576, which is a continuation of Ser. No. 721,692, Jun. 26, 1991, abandoned.

[51] Int. Cl.⁶ ........................................ G06F 1/24
[52] U.S. Cl. ............................................... 395/652
[58] Field of Search ............................ 395/650, 182.11, 395/183.12, 200.01, 651, 692

[56] References Cited

U.S. PATENT DOCUMENTS

| | | | |
|---|---|---|---|
| 3,786,433 | 1/1974 | Notley et al. | 364/186 |
| 4,679,166 | 7/1987 | Berger et al. | 395/650 |
| 5,497,497 | 3/1996 | Miller et al. | 395/800 |

OTHER PUBLICATIONS

National Semiconductor, Memory Databook, 1988, edition, pp. iii, 1-1, 1-4, and 1-181.

Primary Examiner—Richard L. Ellis
Attorney, Agent, or Firm—Knobbe, Martens, Olson & Bear, LLP

[57] ABSTRACT

A system for controlling initialization and self test operations in a multiprocessor system facilitates the use of central processing units based around differing microprocessor types. More specifically, the present invention involves storing configuration information, initialization self-test code, and boot code specific to each processor, memory module, or I/O circuit board in non-executable form in a non-volatile memory, on the respective circuit board, and storing the executable portion of the boot code needed by the initial boot processor in a centrally accessible non-volatile memory. Moreover, the present invention provides a system to automatically transfer default system initialization operations from a default processor to a first alternative processor if the default processor fails, and to automatically transfer initialization operations to a second alternative processor if the first alternative processor fails, and so forth depending upon how many alternative processors are installed in the multiprocessor system.

23 Claims, 4 Drawing Sheets

BOOTING OF MULTIPROCESSOR SYSTEM FROM A BOOT ROM OF NARROWER WIDTH THAN THE SYSTEM MEMORY

This application is a continuation of U.S. patent application Ser. No. 08/052,818, now U.S. Pat. No. 5,450,576, filed Apr. 26, 1993 which is a continuation of U.S. patent application Ser. No. 07/721,692 filed Jun. 26, 1991 now abandoned.

BACKGROUND OF THE INVENTION

1. Field of the Invention

The present invention relates to management of initialization operations in multiprocessor computer systems. Specifically, the invention relates to a method and apparatus to automatically control the determination of which processor in the system will boot the system. If the boot processor fails, control automatically shifts to an alternate processor. Additionally, the present invention involves a system wherein each central processing unit includes a corresponding copy of its own boot code. The boot code is transferred to memory for execution by the corresponding processor to carry out initialization operations.

2. Description of the Related Art

The processing requirements of multi-user computer systems for personal and business needs continuously become more demanding. For instance, more complex application programs for use with local area networks are continuously being developed. Moreover, many multi-user systems provide access to more than one operating environment, such as UNIX and DOS, on the same system.

In general, the computers servicing these needs are single processor systems conforming to conventional architectures using a standard input/output I/O bus such as the Extended Industry Standard Architecture (EISA). New and more powerful systems constantly emerge. However, upgrading an old system generally requires investing in substantial hardware modifications or buying a new system.

One solution to the constantly changing power of microprocessors controlling a system is the CUPID architecture designed by AST Research Inc. In the CUPID architecture, the microprocessor based central processing unit (CPU) is not permanently attached to the backplane bus, but is a removable circuit board running at its own speed, asynchronous with the backplane bus operations. Thus, when more power from the microprocessor is desired, a faster CPU can replace the existing CPU.

However, as processing power demands increase, application software and operating systems performance would benefit from an architecture similar to the CUPID architecture, but which has multiprocessor capabilities to provide parallel processing, and to service high numbers of simultaneous users while still retaining high batch performance.

A number of problems hamper the development of such a multiprocessor architecture, such as, determining which processor boots the system, and, if one processor fails to boot the system, enabling another alternate processor to take over boot operations. Moreover, if after one processor boots the system (by executing instructions out of a read-only-memory (ROM)), but another processor utilizes a different instruction set than the boot processor installed in the system, then this other processor will require access to a different boot ROM.

SUMMARY OF THE INVENTION

Advantageously, a system to provide multiprocessor capabilities would overcome these problems and provide expandability capabilities for adding additional memory, I/O controllers, and CPUs. Such a system would provide high performance batch processing and/or high-availability, multi-user services. The system architecture would also be suitable for a wide range of microprocessor-based designs.

The present invention provides a multiprocessor interconnection architecture with a backplane system bus for use with multiple processors. The architecture provides a method and apparatus to interface multiple processors to the backplane system bus such that upon start-up of the computer system, one default boot CPU is designated to boot the system, and if this CPU fails, control transfers automatically to an alternate processor. This provides fault tolerance and high availability for the system. Additionally, each CPU, memory, and I/O module for the system maintains a copy of the initialization data and self test code portion of its own boot code, and potentially its entire boot code, which can be transferred to memory for execution for the purpose of initialization and self-testing of the associated module.

One aspect of the invention involves a multiprocessor distributed initialize and self test system for use with a multiprocessor interconnect having a backplane bus with connector slots capable of receiving multiple central processing units, memory modules, and other input/output modules. The system has a centrally accessible memory, a default boot central processing unit installed in a first slot on the backplane bus, and may also have one or more alternate boot central processing units installed in a second slot on the backplane bus. The system also has centrally accessible boot code executable by the default central processing unit and the alternate central processing unit. A first slot select circuit associated with the default central processing unit which allows the default central processing unit to execute boot operations, is assigned a pre-determined time-out period, selected by a respective slot identification code. If the time-out period elapses before the default central processing unit successfully boots, the first slot select circuit disables the default central processing unit by placing it in a reset state.

A second slot select circuit associated with the alternate central processing unit holds the alternate processor in a reset state until either the default central processing unit successfully boots the system, or a pre-determined period of time, selected by a respective slot identification code, elapses indicating that the default central processing unit failed to boot the system.

In one embodiment the default boot central processing unit comprises an INTEL 80486 compatible central processing unit, and the alternate central processing unit comprises an INTEL 80486 compatible central processing unit.

Another aspect of the present invention provides a multiprocessor distributed initialize and self test system for use with a multiprocessor interconnect, wherein the interconnect includes a backplane bus capable of connecting multiple central processing units, memory modules, and other input/output modules. The system has a first central processing unit installed in the backplane bus, a second central processing unit installed in the backplane bus, and a centrally accessible memory. The system also has centrally accessible boot code accessible and executable by the default central processing unit. A first non-volatile memory associated with the first central processing unit contains initialization and self test code specific to the first central processing unit. In a preferred embodiment, this is transferred to the centrally accessible memory and assembled for execution by the first central processing unit. A second non-volatile memory associated with the second central processing unit contains boot code specific to the second central processing unit. Preferably, this code may be transferred to the centrally accessible memory and assembled for execution by the second central processing unit.

DETAILED DESCRIPTION OF THE PREFERRED EMBODIMENT

Figure 1:
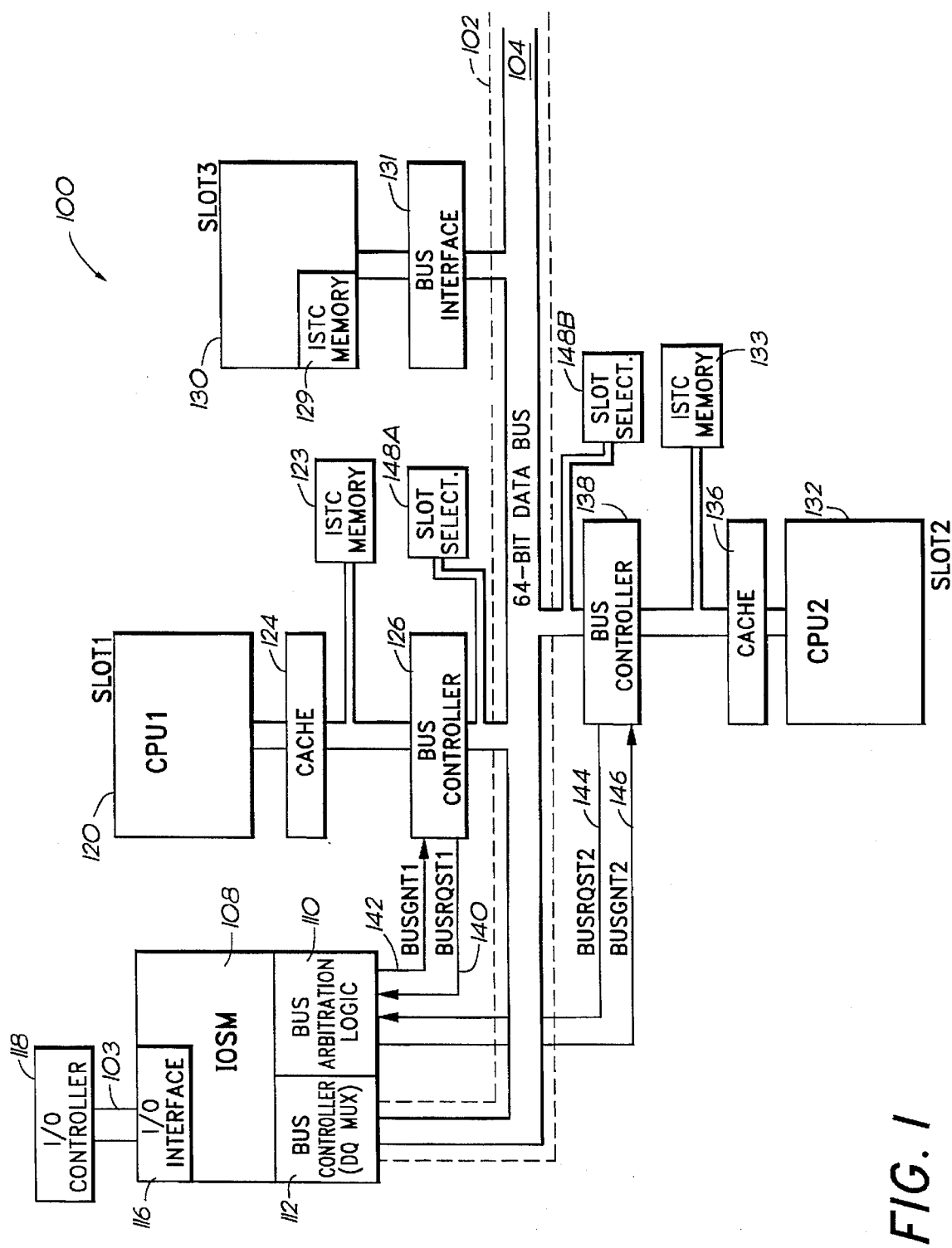
FIG. 1 is a block diagram of an exemplary multiprocessor interconnection system with a backplane system bus according to the present invention.

FIG. 1 is a block diagram of a multiprocessor interconnection system 100. The system 100 of the present embodiment comprises, in general, a backplane system bus 102 with a 64-bit multiple processor data bus 104, an input/output (I/O) bus 103, which advantageously comprises a 32-bit Extended Industry Standard Architecture (EISA) bus in the present embodiment, an input/output services module (IOSM) 108 with a corresponding bus controller 112, a conventional I/O controller(s) 118, a first central processing unit (CPU1) 120 with a corresponding cache 124 and bus controller 126, a memory module 130 with a corresponding bus interface 131, and a second central processing unit (CPU2) 132 with a corresponding cache 136 and bus controller 138. Preferably, the I/O controller(s) 118 comprise(s) conventional EISA or ISA compatible controller(s) in the present embodiment. Advantageously, the I/O bus 103 has 8 I/O connectors (e.g., conventional EISA I/O connectors) for the I/O controller(s) 118, and the backplane system bus 102 for the 64-bit system has eight system connectors along the 64-bit system bus 104. An additional connector designated to contain the IOSM 108 is located between the backplane system bus 102 and the I/O bus 103. The IOSM 108 interfaces the 64-bit system bus 104 with the 32-bit I/O bus 103.

Advantageously, the bus connectors for the 64-bit system are 240 pin METRAL connectors from DuPont, and the bus connector for the IOSM 108 is a 480 pin METRAL connector. The I/O bus connectors in the present embodiment are standard connectors from Burndy Corp., as well known in the art.

The IOSM

Figure 2:
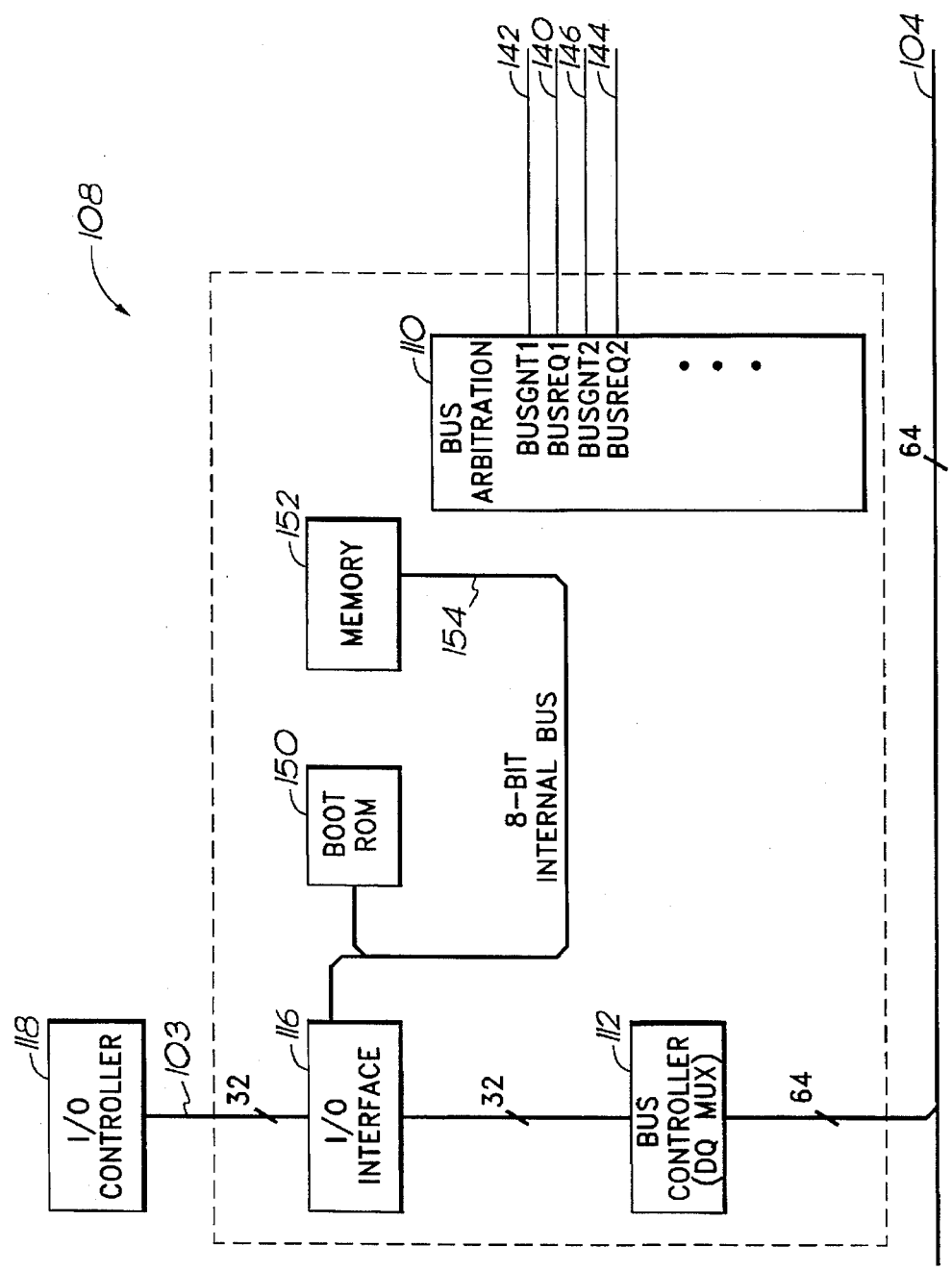
FIG. 2 is a more detailed block diagram of the input/output services module (IOSM) shown in FIG. 1.

The IOSM 108, as shown in more detail in FIG. 2, comprises bus arbitration logic 110, the bus controller 112 which interfaces with the 64-bit system bus 104, an I/O interface 116, which interfaces with the 32-bit I/O bus 103, a central boot read-only-memory (ROM) 150, a memory 152, and an internal 8-bit data bus 154 which interconnects the central boot ROM 150, the memory 152 and the I/O interface 116. Preferably, the internal 8-bit bus 154 also connects to a real time clock (not shown), a parallel port (not shown) a serial port (not shown), a floppy disk controller (not shown), a keyboard controller (not shown), and a system timer/counter (not shown), as well understood in the art.

The I/O interface 116 advantageously comprises a conventional EISA bus controller chip set, well known in the art, and interfaces the conventional I/O controllers 118 and the internal 8-bit bus 154 with the 64-bit multiple processor system bus 104 via the bus controller 112. The bus controller 112 interfaces with the system bus 104 using a 32-bit to 64-bit multiplexer/demultiplexer (a double word/quad word multiplexer ('DQ MUX')). The DQ-MUX of the bus controller 112 breaks up 64-bit words into two 32-bit words, or combines pairs of 32-bit words into 64-bit words, as well known in the art. Advantageously, the bus controller 112 also includes a single level storage buffer (not shown).

In the present embodiment, the central boot ROM 150 comprises a read-only-memory with the basic input/output system (BIOS) instruction set for an INTEL 80486 or 80386 microprocessor. Accordingly, in the present embodiment, at least one CPU connected to the 64-bit bus is, or emulates, an INTEL 80486 or 80386 microprocessor in order to boot the system. Moreover, any alternate boot processors are, or emulate an INTEL 80486 or 80386. However, other processor types may be selected to boot the system with a corresponding change in the boot ROM 150, as well known in the art. Advantageously, the memory 152 comprises 8 Kbytes of complementary metal oxide semi-conductor (CMOS), static random access memory (SRAM).

The bus arbitration logic 110 accepts a number of individual bus requests from various devices which can become bus masters and provides a signal to grant the bus to the device requesting the bus as well understood in the art. The bus arbitration logic 110 operates on a conventional scheme consisting of two signals carried by a bus request (BUSRQSTn) signal line and a bus grant (BUSGNTn) signal line, one of each for every device which can become a bus master. The bus arbitration logic 110 communicates with bus controllers for these operations. For example, the bus controller 126 for the CPU1 120 (FIG. 1) requests the bus by activating a BUSRQST1 signal line 140, and the bus arbitration logic 110 responds with an active signal on the a BUSGNT1 signal line 142 to grant the bus to the bus controller 126. Similarly, the bus controller 138 for the CPU2 132 requests the bus by activating the BUSRQST2 signal line 144, and the bus arbitration logic 110 grants the bus to the bus controller 138 by activating the BUSGNT2 signal line 146. The I/O interface 116 may also obtain control of the bus, on behalf of an I/O controller 118 requesting to be a bus master, with corresponding BUSRQST0 and BUSGNT0 signal lines (not shown).

Devices installed on the system bus 102 advantageously accept a 64-bit transfer even though the actual device may not utilize a full 64-bit data bus. For instance, if the CPU1 120 is based upon an INTEL 80486 which uses a 32-bit data bus, the bus controller 126 accepts a 64-bit transfer from the system bus 102, places this data into the cache 124 which provides a 32-bit interface to the CPU1 120.

The CPU Modules

The CPU1 module 120 could be any microprocessor chip set running at any speed. In the present embodiment, at least one CPU is based upon an INTEL 80486 or compatible microprocessor. Accordingly, throughout the remainder of this description, references to the CPU1 120 assume an INTEL 80486-based CPU with supporting resources and on-board crystal oscillators for independent timing. Other CPUs in the system need not be 80486-based as explained in more detail herein.

CPUs installed in the bus 104 may have independent asynchronous timing with respect to the bus 104.

The CPU1 120 has a corresponding non-volatile memory 123 which contains configuration information and CPU specific initialize and self test code (ISTC) for the CPU1 120, and further comprises a slot select circuit 148A which is explained in detail below. In one alternative embodiment of the invention, the non-volatile memory 123 comprises a programmable read-only-memory (PROM), as well known in the art. In the present embodiment, the cache 124 for the CPU1 120 is a 256-Kbyte, two-way, set-associative, write-back cache with a 32-byte line size (4 bus cycles×8 bytes). The cache 124 interfaces the asynchronous CPU1 120 with the synchronous 64-bit bus 104 via the bus controller 126 which responds to signals on the BUSRQST1 signal line 140 and the BUSGNT1 signal line 142 as explained. The cache 124 supports write-back and the conventional Modified, Exclusive, Shared, Invalid (MESI) protocol to maintain cache coherency for the multiprocessor system 100. The cache 124 has a corresponding 64-bit interface (not shown) for the 64-bit bus 104 and a 32-bit interface (not shown) with the 80486 processor. When the cache 124, or any other cache, generates a write-back cycle, it asserts an active low signal on the write-back start (WBSTRT-) control line (not shown) to indicate the beginning of a write-back cycle from the cache, as well understood in the art.

The CPU2 132 is similar to the CPU1 120 except that the CPU2 132 need not be an 80486 or 80386 based CPU. The CPU2 132 includes an non-volatile ISTC memory 133 which contains configuration information and ISTC for the microprocessor of the CPU2 132. The CPU2 132 also comprises a slot select circuit 148B, and has a corresponding bus controller 138 and a cache 136 similar to those associated with CPU1 120. Further CPUs may also be added to the system and need not comprise INTEL 80486 or 80386 based CPUs.

The Memory Modules

In the present embodiment, the memory module 130 accepts 64-bit transfers. However, memory modules need not be capable of accepting full 64-bit transfers. Advantageously, the memory 130 comprises 40-bit single-in-line memory modules (SIMMs) which could be constructed from 1-Meg-by-4 or 4-Meg-by-4 dynamic random access memories (DRAMs). Toshiba's THM401020SG-80 is an exemplary 10-chip SIMM appropriate for use in the present system. The memory 130 supports 64 megabytes (Mbytes) (per module) of RAM with 1-Meg-by-4 DRAM based SIMMs, or 256 megabytes (per module) with 4-Meg-by-4 DRAM based SIMMs. The present embodiment allows up to four 256 Mbyte memory modules to be installed in the system. The memory module 130 also includes error correction code (ECC) capability for reliability. However, to eliminate the read-modify-write cycle caused by 32-bit operations on a 64-bit ECC memory, ECC is performed on a 32-bit basis and not on a 64-bit basis.

The memory module 130 also comprises a DRAM controller (not shown) which provides conventional row address select (RAS), column address select (CAS), hidden refresh, address multiplexing, page mode and burst mode support. Accordingly, the DRAM controller comprises DRAM RAS/CAS address multiplexers, RAS/CAS generation logic, refresh counters, page-mode/page-hit logic and DRAM address drivers, all well understood in the art. The DRAM controller derives memory timing from an external clock signal carried on the system bus 104, and therefore, runs synchronously with the system bus 104.

In the present embodiment, the memory 130 also includes a corresponding bus interface 131 to the 64-bit bus 104.

Advantageously, the bus interface 131 comprises a 8-level deep by 64-bit wide register. Parity generation and checking for the bus interface 131 is performed on a byte-by-byte basis on the 64-bit bus side of the register.

Additionally, the memory has an associated non-volatile ISTC memory 129 which contains the ISTC for the memory 130.

Figure 3:
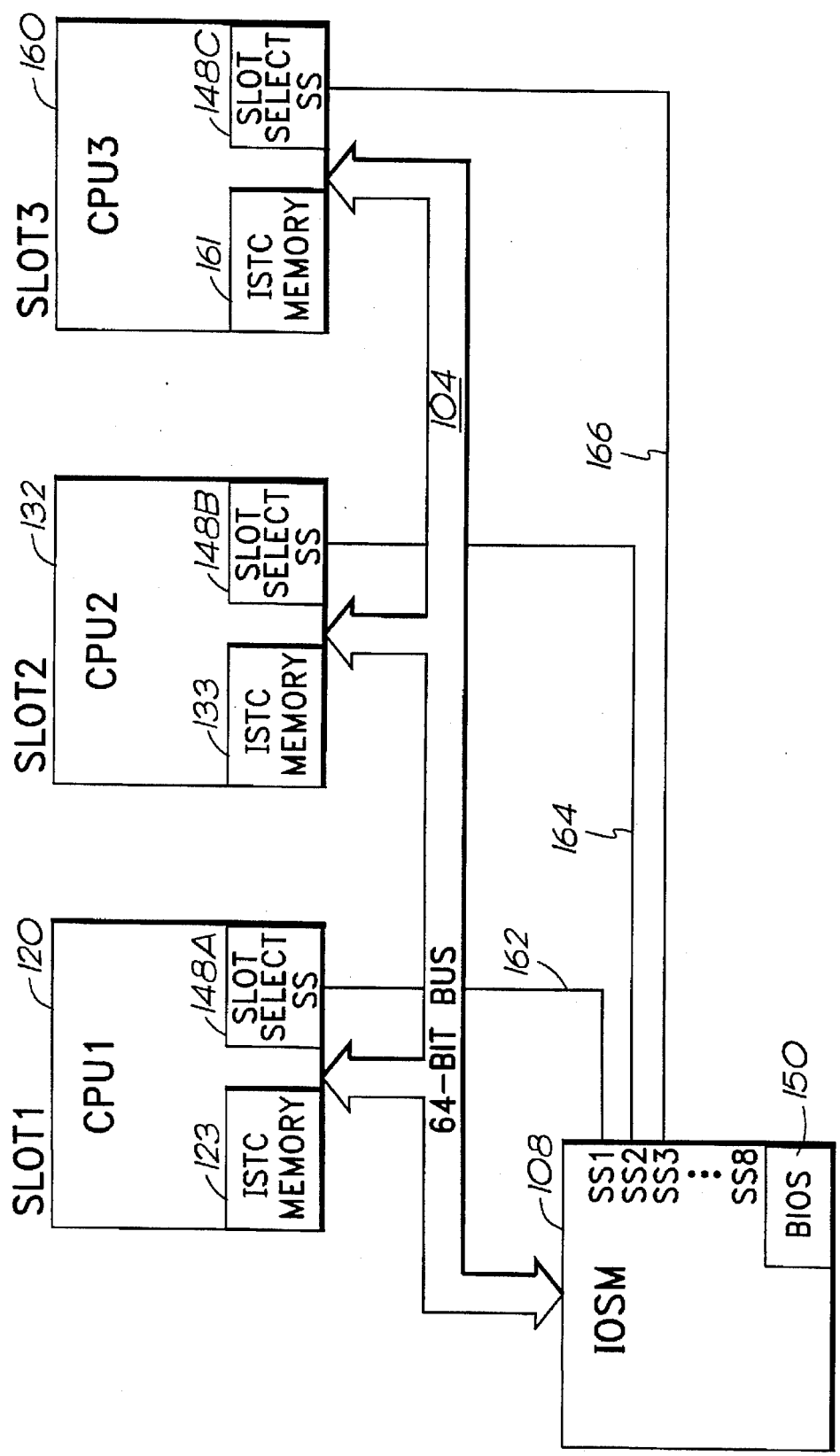
FIG. 3 is a block diagram of a configuration of a multiprocessor interconnection system with three central processing units and illustrates the slot select interconnections between the IOSM and the slot select circuits of the present invention.

FIG. 3 illustrates an embodiment with three CPUs: the CPU1 120 installed in slot 1, the CPU2 132 installed in slot 2, and a CPU3 160 installed in slot 3 with a corresponding ISTC memory 161 and a slot select circuit 148C. FIG. 3 further illustrates the connections from the slot select circuits 148A, 148B, and 148C to the IOSM 108. As seen in FIG. 3, the slot select circuit 148A for the CPU1 120 connects to the IOSM 108 with a slot select signal line (SS1) 162. Similarly the slot select circuits 148B and 148C connect to the IOSM 108 with slot select signal lines (SS2 and SS3) 164 and 166 respectively. Any other slot select circuits on CPUs installed in the system have a corresponding slot select signal line from the IOSM 108. The SS1, SS2 and SS3 signal lines 162, 164, and 166 respectively, connect to a respective SLOT_SELECT signal line 193 (FIG. 4) for each slot select circuit 148A, 148B and 148C, respectively. The signals on the SSn signal lines are controlled by a memory or I/O mapped slot select register (not shown) in the IOSM 108. Thus, the CPUs in the system can access or change the signals on these lines by executing a read or write to the memory or I/O mapped address for the register. These SSn signal lines are used during boot operations as explained herein.

The Slot Select Circuits

Figure 4:
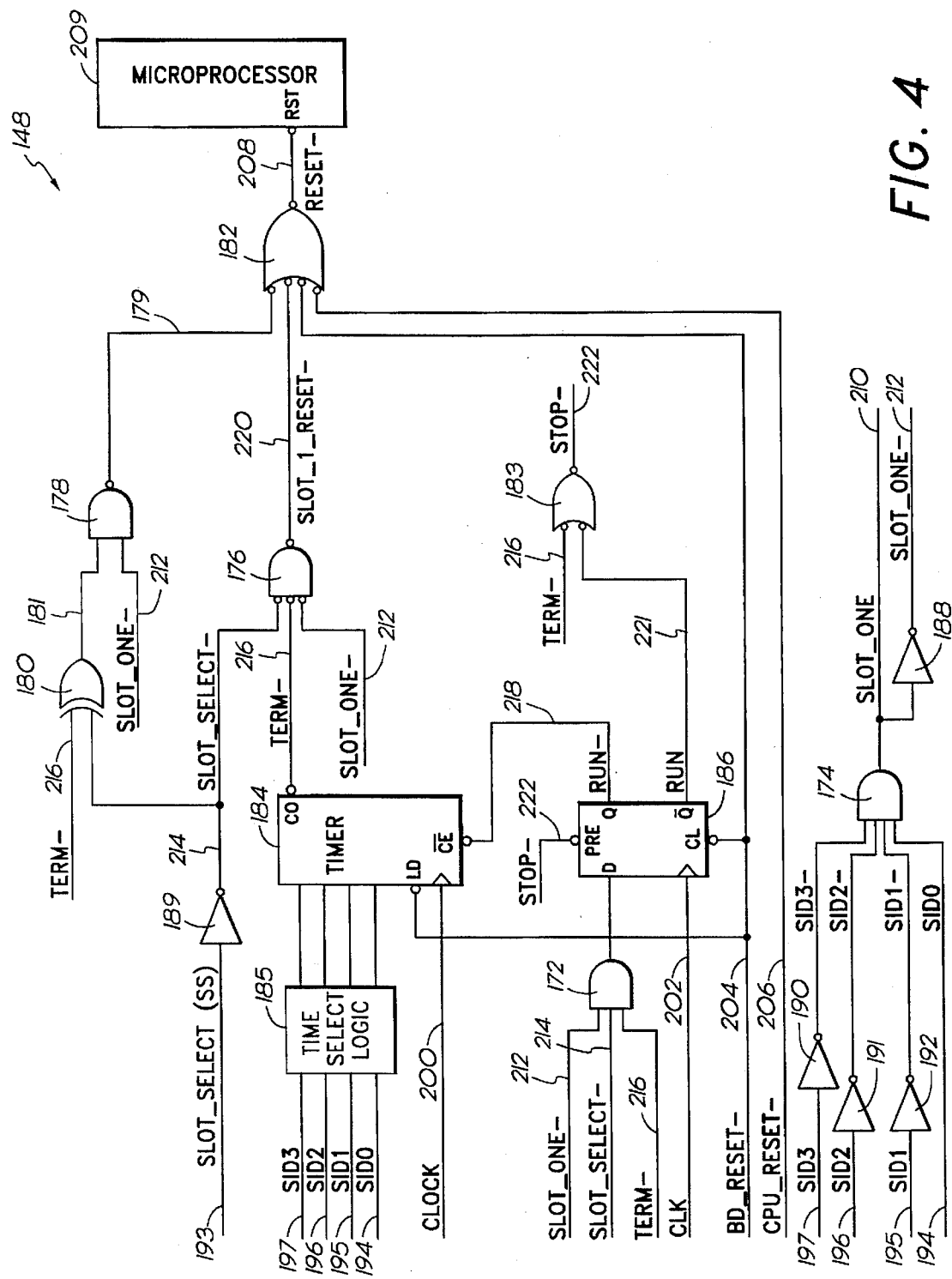
FIG. 4 is a schematic diagram of the slot select logic of the present invention.

FIG. 4 illustrates the logic 148 corresponding to the slot select circuits 148A and 148B and slot select circuits for any other CPU installed in the system. The slot select logic 148 comprises AND gates 172, 174, 176, a NAND gate 178, an EXOR gate 180, OR gates 182, 183, a timer 184, time select logic 185, a latch 186, and inverters 188, 189, 190, 191, and 192. The timing circuit responds to signals on a SLOT_SELECT signal line 193, SLOT_ID (SID0, SID1, SID2, SID3) signal lines 194–197, a CLOCK signal line 200, a CLK signal line 202, a BD_RESET- signal line 204, and a CPU_RESET- signal line 206. The slot select circuit 148 provides a signal on a RESET- signal line 208 connected to the reset pin of the microprocessor 209 on the CPU board. The slot select circuit 148 further responds to a number of internal signal lines, such as a SLOT_ONE signal line 210, a SLOT_ONE- signal line 212, a SLOT_SELECT- signal line 214, a TERM- signal line 216, a RUN- signal line 218, a SLOT_1_RESET- signal line 220, a RUN signal line 221, and a STOP- signal line 222. The functions of these signal lines are further explained herein.

Distributed Initialize Function

In the multiprocessor system 100 which utilizes a system bus 102, a number of problems can arise if more than one processor type is installed on the 64-bit bus 104. For instance, provision needs to be made to determine which processor will boot the system, and if this "default" boot processor fails to boot the system, an alternative processor, if one is installed, should take over boot operations to enhance the availability of the system.

Another potential difficulty with the multiprocessor system 100 is that a central system boot ROM 150 should be accessible by all CPUs for initialization operations. However, the boot code for each CPU in the system may differ. Thus, changes to the system boot code are often needed when the processor type changes, when problems are found, or when the memory, cache and I/O features are enhanced. Even if boot code for numerous processors were included in the central boot ROM 150, as new developments emerge, the boot ROM would need updating.

The present invention solves this problem by providing memories (e.g., ISTC memory 123, ISTC memory 133, and ISTC memory 129, etc.) for each CPU, I/O board, and memory module. These ISTC memories contain configuration, and initialization and self-test code (ISTC) (commonly referred to as the power-on self test (POST) and INITIALIZE portion of the boot code in the art) specific to the respective CPU, I/O board or memory module. The CPU ISTC memories hold configuration information and the ISTC specific to the associated CPU, and the I/O board ISTC memories hold the peripheral configuration information and the ISTC for the associated I/O board. For instance the memory 123 contains configuration information and ISTC for the CPU1 120 and the memory 133 contains configuration information and ISTC for CPU2 132, and the memory 129 contains configuration information and ISTC for testing and initializing the memory module 130.

Advantageously, the PROMs 123, 129, 133, and any other ISTC memories are memory mapped, and preferably addressable in upper memory space (e.g., above the 2 gigabyte boundary). The precise address location mapped to each ISTC memory on a circuit board depends upon the slot in which the board is installed. For instance, advantageously, the memory 123 on CPU1 120 is addressable beginning at address location D100,0000 hexadecimal (hex), if CPU1 120 is installed in slot 1, and the memory 133 on CPU2 132 is addressable beginning at address location D200,0000 hex, if CPU2 132 is installed in slot 2 on the bus.

However, if each circuit board ISTC memory contained boot code in executable form (e.g., 32-bit words for INTEL 80486 based CPUs) and was directly accessible for execution of the code in the ISTC memory, then each board would need data shift logic to interface the ISTC memory with the 64-bit system bus 104. This logic would add to the complexity, and therefore increase the cost, of the system. Therefore, in the present embodiment, the ISTC memories are 8 bits (1 byte) wide and are not directly accessible for execution of the code (i.e. the ISTC memories are execution inaccessible). In the present embodiment, the board specific code held in the ISTC memories on the circuit boards is accessible on a byte-by-byte, non-executable basis. Accordingly, in the present embodiment, the ISTC memories interface with the least significant byte of the system bus 104.

When a circuit board is initializing, the board specific ISTC is transferred from the associated ISTC memory to the memory 130 by the boot processor and assembled into executable code. The non-executable code is assembled by transferring the code, byte-by-byte, from the byte-wide memory into 32-bit words in the memory 130.

The assembly of the information in the ISTC memories into system memory 130 preferably involves moving the information, byte-by-byte in the present embodiment, into a register until 4 bytes are assembled in the register (or 8 bytes if the system memory is 8 bytes wide). Then the contents of the register are preferably moved to the system memory 130 in one move operation. Alternatively, the ISTC memories could be assembled directly on a byte-by-byte basis into the system memory, but this would require more time because of the increase in system memory accesses.

As well understood in the art, conventional addressing allows byte addressing of the bytes on the system bus 104. For instance, the INTEL 80386 and 80486 provide address lines starting at address line A2 (the third significant bit in the address) and provide four byte enable lines for selecting which bytes are active during a bus transaction. As explained above, in the present embodiment, the ISTC memories are one byte wide and interface to the least significant byte of the system bus 104. Therefore, the byte enable lines select the least significant byte as active during transfers from the ISTC memories to the memory 130 and any data on the remaining seven bytes of the system bus 104 are ignored.

However, in an alternative embodiment, the ISTC memories may be wider that one byte. Preferably, the width of the ISTC memory interface to the system bus 104 is contained along with the configuration information in the ISTC memory. Thus, the system can determine how to transfer the information from an ISTC memory to the memory 104.

In order to properly access the ISTC memories, the address lines of these ISTC memories connect to system address lines A3 and above (where A0 is the least significant bit). In this manner, incrementing the address on the system address lines by eight, is detected by the ISTC memories as an increment of one on address line A3, and the byte enable line are used to select which bytes are active on the system bus 104.

For instance, if the ISTC memory interface to the system bus 104 is two bytes wide, then the software which transfers the information from an ISTC memory to the system memory 130 for execution preferably transfers two bytes at a time instead of a single byte per transfer. The byte enable lines are used to select the two least significant bytes as active on the system bus 104 with each transfer.

Once the ISTC is assembled in memory, it is executed from memory by the corresponding CPU, or executed by the boot CPU if the ISTC corresponds to a memory module or I/O circuit board.

However, until a processor is controlling the system, the non-executable code from the ISTC memories is inaccessible by a CPU attempting to boot the system. Therefore, a central boot ROM is still needed that is accessible to any CPU which can boot the system. In the present embodiment, a central system boot ROM 150 accessible by all processors contains INTEL 80×86 executable boot code in addition to conventional DOS BIOS CALL code which may be used by the operating system, as well understood in the art. Accordingly, in the present embodiment, the boot CPU is based around an INTEL 80×86 compatible processor (e.g., an INTEL 80486). Because the only board unique to the entire system is the IOSM 108, the boot ROM 150 (FIG. 2) provides the central system boot code and contains the conventional DOS BIOS code.

Upon power-up reset, the default boot CPU (assume this is CPU1 120 for present discussion) executes code from the system boot ROM 150 (this code is for an INTEL 80×86 which is why the boot CPU is an 80×86 based CPU in the present embodiment). As previously explained, the ISTC memory associated with each CPU contains the ISTC code as well as configuration information about the CPU. Thus, the boot CPU determines how many CPUs are present on the bus 104 by reading the memory location assigned to the ISTC memory for each slot (e.g. D100,0000 hex for slot 1, D200,0000 hex for slot 2, etc). If a slot contains a CPU, then the boot CPU will receive information about the type of CPU installed in the slot.

The CPU1 120 then tests the first megabyte of memory in the system and sets a 'check-in-word' in the CMOS portion of the memory 152. Once the integrity of the first megabyte of memory is established, the CPU1 120 copies and assembles its own ISTC byte-by-byte from its ISTC memory 123 into memory in 32-bit word executable format and begins executing its own ISTC. Once the CPU1 120 is initialized, it checks itself 'in' by writing to the check-in-word in the CMOS portion of the memory 152.

After the CPU1 120 is checked 'in', it copies the ISTC from the ISTC memory 129 to the memory 130, executes the ISTC, and creates a memory configured/memory good table in the CMOS portion of the memory 152.

Once the memory module 130 is configured (and any other memory modules installed in the system are configured), the CPU1 120 transfers and executes the ISTC from appropriate ISTC memories on the I/O controllers that are installed on the system bus 104. Then, the CPU1 120 transfers the next CPU's (assume CPU2 132 for present discussion) ISTC from the next CPUs's associated ISTC memory (memory 133 for the CPU2 132) to the memory 130 and allows the CPU2 132 to exit a reset state and execute its own ISTC. After successful completion of the initialization and self test, the CPU2 132 checks 'in.'

Once each CPU in the system has executed its ISTC and has checked 'in,' the CPU1 120 controls the system again and begins the operating system boot process.

If one or more CPUs in the system are not INTEL 80×86 based CPUs, then the ISTC memories for these CPUs would hold the entire boot code for these CPUs, not just the configuration information and ISTC.

A time limit is provided for each stage of the boot process so that if the time allotted for a device to initialize and check-in is exceeded, that device is assumed to be non-functional and is disabled. The remaining hardware may then attempt to complete the boot process. When multiple CPUs are installed in the system, if the default boot processor exceeds the time allotted for it to boot (it fails), an alternative boot processor can take over boot operations as explained below.

Alternative Boot Processor Functions

In a multiprocessor environment, one critical determination is which processor will boot the system. Moreover, if one processor fails, provision for disabling the non-functional processor and allowing another alternative processor to boot the system enhances the availability of the system. With multiple CPUs connected to the same bus, the problem is automatic boot control of the system. The reason for the difficulty is that until at least one CPU is operating the system, no microprocessor control is available to supervise the other processors.

Accordingly, in the present invention, each CPU on the bus includes slot select logic 148 (FIG. 4). In general, at power-up or system reset the slot select logic 148 for each CPU, is loaded with a time-out count dependant upon the slot in which the board is installed. Each slot connector has four hard connections which provide signals for a 4-bit identification code (slot ID) on signal lines 194–197 for a board installed in the slot. The signals on the SLOT_ID signal lines 194–197 select a pre-determined time-out period from the time select logic 185 corresponding to the time-out period assigned to the slot in which the slot select logic 148 is installed. The time-out period for the slot select logic 148A is a lower value than the time-out period for the slot select logic 148B and so forth. Advantageously, the time select logic 185 may comprise a programmable logic array or a read-only-memory with time-out values programmed corresponding to each slot. In general, the slot select logic 148 on the default boot CPU allows this CPU to boot. The remainder of the slot select logic circuits 148, installed in other slots, hold the associated CPUs in reset until the predetermined time-out period has expired for the associated CPU, or until the boot CPU successfully boots the system and then activates the CPUs in other slots.

If the default boot CPU does not successfully boot and disable its own slot select logic 148 before it times-out, it enters a reset state. The next CPU (based upon a slot identification) then times-out and exits the reset state and attempts to boot the system as an alternate boot processor. The alternate boot processors are the same type processor as the default boot processor so that they can execute the boot code in the central boot ROM 150 (e.g., in a preferred embodiment, the alternate boot processor(s) is an 80486 compatible). As part of the alternate processor boot operations, it disables CPUs installed in slots with a lower number than its own that have not checked 'in.' If the alternate boot CPU fails to boot, then another CPU (of the same processor type) has a chance to boot the system and so forth.

If after all the CPUs installed in the system have booted, but one or more have failed to check-in, the boot CPU disables any CPUs which failed to check-in.

The slot select logic 148 is described in more detail in reference to the CPU1 120 installed in slot 1 as the default boot processor and the CPU2 132 installed in slot 2 as the alternate boot processor. The slot select circuit 148A for CPU1 120 is identical to the slot select circuit 148B for CPU2 132, however, the circuits 148A, 148B provide slightly different functions depending on in which slot each circuit is installed.

Installed in Slot 1

In the present embodiment, slot 1 contains the default boot CPU. Thus, the CPU1 120 in slot 1 is first allowed to boot the system. The general function of the slot select logic 148A installed in slot 1 is to allow the CPU1 120 to perform system boot operations. However, if the CPU1 120 fails to boot properly, the slot select logic 148A disables CPU1 120 and control automatically shifts to the next CPU in the system—in the depicted embodiment, the CPU2 132 in slot 2—as described in more detail below.

The SLOT_ONE signal line 210, the SLOT_SELECT signal line 193 and a TERM- signal line 216 carry the main control signals for the slot select logic 148A and the resulting signal from the logic 148A is a reset signal on the RESET- signal line 208 (FIG. 4). The values of the reset signal for varying combinations of signal levels on the SLOT_SELECT signal line 193, the TERM- signal line 216 and the SLOT_ONE signal line 210 for circuit boards installed in slot 1 are shown in Table 1 below. Corresponding values for circuit boards installed in slots 2–8 are shown in Table 2 below.

TABLE 1

| | Slot 1 | | | |
|---|---|---|---|---|
| | SLOT_ONE | SLOT_SELECT | TERM- | RESET- |
| BOARD RESET | 1 | 1 | 1 | 0 |
| FAIL | 1 | 1 | 0 | 0 |
| RUN | 1 | 0 | 0 | 1 |
| SHUT DOWN | 1 | 0 | 0 | 0 |

As seen in row 1 of Table 1, at board reset, the SLOT_SELECT line 193 and the TERM- signal line 216 from the timer 184 are both at a high level, regardless of the slot in which a circuit board is installed. For a circuit board installed in slot 1, the SLOT_ONE signal line 210 is also high because the AND gate 174 in conjunction with the inverters 190, 191, and 192 decodes the slot ID on signal lines 194–197 to produce an active signal on the SLOT_ONE signal line 210. This signal is inverted by the inverter 188 to produce a low signal on the SLOT_ONE- signal line 212. The high signal on the SLOT_SELECT signal line 193 is inverted by the inverter 190 to produce a low signal on a SLOT_SELECT- signal line 214.

The function of the SLOT_SELECT line 193 changes for the slot select circuit 148A in slot 1 depending on the output of the timer. While the timer is running, the signal on the SLOT_SELECT signal line 193 has no effect on the slot select circuit 148A. When the timer stops running, then a low signal on the SLOT_SELECT signal line 193 indicates that the slot is enabled, while a high signal disables the CPU1 120 in slot 1.

As long as the BD_RESET- signal line 204 is active, all circuit boards in the system are held in reset because the active signal on the BD_RESET- signal line 204 activates the OR gate 182 connected to the RESET- signal line 208 which provides a reset signal to the microprocessor 209 (FIG. 4).

The BD_RESET- signal line 204 becoming active also loads the time-out value from the time select logic 185 into the timer 184, and clears the latch 186 which produces a low signal on the RUN- signal line 218 and a high signal on the RUN signal line 221. The low signal on the RUN- signal line 218 enables the timer 184 to start counting down from the value provided by the time select logic 185 once the BD_RESET- signal line 204 becomes inactive. The timer 184 continues to run until the latch 186 produces a high signal on the RUN- signal line 218. This occurs if the AND gate 172 is activated or the STOP- signal line 222, which is connected to the preset input of the latch 186, becomes active, as further explained herein.

Until the timer, which is counting down, reaches the terminal count of zero, the signal on the TERM- signal line 216 remains high. With the signal on the TERM- signal line 216 at a high level, the AND gate 176 also remains inactive. However, because the SLOT_SELECT- signal line 214 and the SLOT_ONE- signal line carry low signals at this point, if the timer 184 reaches zero before the signal on the SLOT_SELECT- signal line 214 becomes high (the CPU1 120 failed to boot), the signal on the TERM- signal line 216, which becomes active when the timer reaches zero, activates the AND gate 176 to provide a low signal on the SLOT_1_RESET- signal line 220.

The low signal on the SLOT_1_RESET- signal line 220 activates the OR gate 182 to produce a low signal on the RESET- signal line 208 and hold the microprocessor 209 in reset (i.e. to disable the circuit board).

The active signal on the TERM- signal line 216 activates the OR gate 183 to produce an active signal on the STOP- signal line 222. The active signal on the STOP- signal line 222 stops the timer 184 by activating the preset connection to the latch 186. Thus, the latch 186 drives the RUN- signal line 218 high to stop the timer 184 from operating and also drives the RUN signal line 221 low which also activates the OR gate 183 to produce the active signal on the STOP- signal line 222. Advantageously, this prevents the latch 186 from activating the RUN- signal line 218 until another board reset is signalled on the BD_RESET- signal line 204. The signals stabilize as indicated in the FAIL row in Table 1.

Because the signal on the SLOT_ONE- signal line 212 is low, the NAND gate 178 remains inactive with a high signal on a signal line 179. Thus, the signal from the NAND gate 178 does not effect operation of the OR gate 182 if the circuit board is installed in slot 1. Accordingly, as long as the BD_RESET- signal line 204 and the CPU_RESET- signal line 206 also remain inactive, the signal from AND gate 176 on the SLOT_1_RESET- signal line 220 controls the OR gate 182.

If the CPU1 120 boots properly, it changes the level of SS1 signal line 162 from the IOSM 108 by writing to the memory or I/O mapped slot select register in the IOSM 108 as previously explained. The SS1 signal line 162 connects to the SLOT_SELECT (SS) signal line 193 for slot select circuit 148A. The change in the level on the SS1 signal line results in a low level on the SLOT_SELECT signal line 193 and a high level on the SLOT_SELECT- signal line 214. The high level on the SLOT_SELECT- signal line 214 prevents the AND gate 176 from becoming active when the TERM- signal line 216 becomes active upon the timer 184 reaching zero. Thus, when the CPU1 120 boots properly, the SLOT_1_RESET- signal line 220, the OR gate 182, and the RESET- signal line 208 remain inactive even if the TERM-signal line 216 becomes active.

Even after the CPU1 120 in slot 1 has booted, the timer continues to time-out to activate the TERM- signal line 216. The timer stops at zero because the active signal on the TERM- signal line 216 activates the OR gate 183 to produce an active signal on the STOP- signal line 222. The active signal line the STOP- signal line 222 presets the latch 186 to produce a high signal on the RUN- signal line 218 which stops the timer 184 from operating, and leaves the timer 184 with the TERM- signal line 216 active. Accordingly, when the CPU1 in slot 1 properly boots, the slot select logic becomes stable with AND gate 176 and the OR gate 182 inactive so that signal line 208 is inactive and the processor is not held in reset. The stable signals are indicated by the 'RUN' row in Table 1.

From the state shown in the RUN row of Table 1, the IOSM 108 can reset the CPU1 120 by activating the corresponding SS1 signal line 162 which connects to the SLOT_SELECT signal line 193 of the slot select circuit 148A. An active signal on the SLOT_SELECT signal line 193 resets the CPU1 120 because the corresponding active signal on the SLOT_SELECT- signal line 214 activates the AND gate 174 (the TERM- signal line 216 and the SLOT_ONE- signal line 212 are also active) to activate the SLOT_1_RESET- signal line 220 which activates the OR gate 182 as previously explained. The signals stabilize as indicated in the 'Shut Down' row of Table 1.

With the CPU1 120 installed in slot 1, the AND gate 172 remains inactive and does not effect operation of the slot select logic 148A because the SLOT_ONE- signal line 212 is low which prevents the AND gate 172 from being activated.

Installed in Slot 2–8

The general function of the slot select logic 148 installed in any of the slots 2–8 is to hold the corresponding CPU in reset until CPUs in previous slots have had sufficient (predetermined) time to boot. In other words, for the CPU2 132 installed in slot 2, the slot select logic 148B holds the CPU 132 in a reset state until sufficient time has elapsed for the CPU1 120 to boot. If the CPU1 120 does not complete boot operations within the time allotted, then the CPU2 132 takes over default boot operations as an alternative boot processor instead of CPU1 120. If the CPU1 120 does boot properly, then the CPU2 132 checks in as an additional processor rather than taking over as a boot processor.

Table 2 below indicates the value of the signals on the RESET- signal line 208 for various combinations of signals on the TERM- signal line 216, the SLOT_SELECT signal line 193 and the SLOT_ONE signal line 210. The function of the slot select logic 148 for slots 2–8 is explained with reference to CPU2 132 in slot 2 of the bus 104.

TABLE 2

| | Slots 2–8 | | |
|---|---|---|---|
| | SLOT_ONE | SLOT_SELECT | TERM- | RESET- |
| BD_RESET | 0 | 1 | 1 | 0 |
| ALT BOOT | 0 | 1 | 0 | 1 |
| RUN | 0 | 0 | 1 | 1 |
| FAIL | 0 | 0 | 0 | 0 |

Upon a board reset, the active pulse on the BD_RESET- signal line 204 loads the timer 184 with the value from the time select logic 185 corresponding to the slot 2 four-bit slot ID on lines 194–197 and the timer 184 begins to operate (as explained for slot 1). The slot ID value loaded in the timer 184 is greater than the value for slot 1 and is pre-selected to allow enough time for the CPU1 120 in slot 1 to execute initialization operations.

At board reset, the SLOT_SELECT signal line 193 is high, as seen in Table 2, which is inverted by the inverter 189 to a low level on the SLOT_SELECT- signal line 214. The TERM- signal line 216 is high because the timer 184 is active. The high signal on the TERM- signal line 216 and the low level on the SLOT_SELECT- signal line 214 activate the EXOR gate 180 which produces a high level on a signal line 181 connected to the NAND gate 178. The high level signals on the signal line 181 and the SLOT_ONE- signal line 212 combine to activate the NAND gate 178 which produces an active signal on the signal line 179. The active signal on signal line 179 activates the OR gate 182 to produce an active signal on the RESET- signal line 208 to hold the CPU2 132 in reset.

For CPU2 132 in slot 2, the SLOT_ONE signal line is inactive because the AND gate 174 in conjunction with the inverters 190, 191, and 192 does not detect the correct slot ID on signal lines 194–197 to indicate that the CPU2 132 is installed in slot 1. Thus, the SLOT_ONE- signal line 212 is high because the inactive signal on the SLOT_ONE signal line 210 is inverted by the inverter 188 to produce a high signal on the SLOT_ONE- signal line 212.

If the CPU1 120 in slot 1 boots properly before the timer 184 for the CPU2 132 in slot 2 times out, the timer 184 for the CPU2 132 is prevented from counting and the RESET- signal line 208 becomes inactive, allowing the CPU2 132 to boot. The signals stabilize as seen in the 'RUN' row of Table 2.

The timer stops because when the CPU1 120 boots properly, the CPU1 120 changes the level of the SS2 signal line 164 in the IOSM 108 which is connected to the SLOT_SELECT line 193 for the slot select circuit 148B. This results in a high signal on the SLOT_SELECT- signal line 214. The high signal on the SLOT_SELECT- signal line 214, the high signal on the SLOT_ONE- signal line 212, and the high signal on the TERM- signal line 216 combine to activate the AND gate 172 to produce a high signal for the input to the latch 186. A pulse on the CLK signal line 202 causes the high signal to propagate through the latch 186 to the RUN- signal line 218 to stop the timer 184. This results in a low signal on the RUN signal line 221, which causes the OR gate 183 to activate the STOP- signal line 222. The active signal on the STOP- signal line 221 presets the latch 186 to hold the RUN- signal line 218 high and the RUN signal line 221 low. Accordingly, the signal on the TERM- signal line 216 remains high because the timer did not time-out.

The RESET- signal line 208 becomes inactive because the low signal on the SLOT_SELECT signal line 193 is inverted by the inverter 189 to a high level on the SLOT_SELECT- signal line 214. The high signals on the TERM- signal line 216 and the SLOT_SELECT- signal line 214 combine to cause the EXOR gate 180 to become inactive and produce an inactive low signal on the signal line 181. The inactive signal on the signal line 181 from the EXOR gate 180 inactivates the NAND gate 178 which produces an inactive signal on the signal line 179 to inactivate the NOR gate 182. The AND gate 182 produces an inactive signal on the RESET- signal line 208 which allows the microprocessor of the CPU2 132 to exit the reset state and initialize itself as explained above.

If the CPU1 120 in slot 1 does not boot (proper boot is indicated by a change in the level of the SLOT_SELECT signal line 193 from high to low) before the timer 184 in slot 2 times-out, then the CPU2 132 exits the reset state and attempts to boot the system as an alternate boot CPU.

The TERM- signal line 216 becomes active when the timer 184 times-out. The SLOT_SELECT signal line 193 remains high because the CPU1 132 (which failed to boot) did not change the level of this signal. The active (low) signal on the TERM- signal line 216 and low signal on the SLOT_SELECT- signal line 214 deactivate the EXOR gate 180 which produces an inactive signal on the signal line 181 to deactivate the NAND gate 178. The inactive NAND gate 178 provides an inactive signal on the signal line 179 which allows the OR gate 182 to become inactive and produce an inactive signal on the RESET- signal line 208. Accordingly, the CPU2 132 exits from the reset state and takes over boot operations in place of the CPU1 120. By checking the level of the SLOT_SELECT signal line 193, the CPU2 132 determines that the CPU1 132 failed to boot and that it (the CPU2 132) is now the boot CPU. If the CPU2 132 boots properly, then the signals stabilize as indicated in the 'ALT BOOT' row of Table 2.

The functional level of the signal on the SLOT_SELECT signal line 193 changes depending upon the output of the timer 184 for slot select logic 148B installed in slot 2 (as well as for slot select logic 148 installed in all other slots 3–8). While the timer is running, a low signal on the SLOT_SELECT signal 193 freezes the timer and indicates that slot 2 is enabled and a high on the SLOT_SELECT signal line 193 disables the slot. When the timer 184 stops running, a low signal on the SLOT_SELECT signal line 193 indicates that the slot 2 is disabled, and a high signal indicates that the slot is enabled. The change in level on the SLOT_SELECT signal line 193 from high to low if the CPU2 132 also failed to boot occurs because the timer 184 for CPU3 160 in slot 3 will time-out and begin to boot the system. When the CPU3 160 begins boot operations, it disables the CPU2 132 by changing the level of the SS2 signal line 164 in the IOSM 108 to a low level.

Thus, regardless of which CPU boots the system, the boot CPU can let other CPUs time out, at which time they will begin to initialize. Otherwise, the boot CPU can specifically enable them before they time-out by use of the SLOT_SELECT signal line 193, or the boot CPU can disable the timer on any or all CPUs and hold the corresponding CPUs in reset by toggling the corresponding SLOT_SELECT line 193.

Accordingly, after the CPU1 120 in slot 1 has failed to boot properly, and the CPU2 132 in slot 2 takes over boot operation, the timer 184 of slot select circuit 148B has stopped operating and the signal on the TERM- signal line 216 is active. The level on the SLOT_SELECT line 193 remains high as explained above which indicates at this point that the CPU2 132 is enabled. However, if the level on the SLOT_SELECT signal line 193 now changes to low (driven by the IOSM 108 with the SS2 signal line 164), indicating that the CPU2 132 failed to boot the system within the time allotted for the CPU2 132 to complete boot operations, then the CPU2 132 enters a reset state because the active signal on the TERM- signal line 216 combines with the now high signal on the SLOT_SELECT- signal line 214 in the EXOR gate 180 to produce an active signal on the signal line 181. The active signal on the signal line 181 combines with the high signal on the SLOT_ONE- signal line 212 to activate the NAND gate 178 which in turn provides an active signal on the signal line 179 to activate the OR gate 182 to hold the microprocessor of the CPU2 132 in reset. Accordingly, the signals become stable as indicated in the 'FAIL' row of Table 2.

Although preferred embodiments of the present invention has been described and illustrated above, those skilled in the art will appreciate that various changes and modifications can be made to the present invention without departing from its spirit. Accordingly, the scope of the present invention is deemed to be limited only by the scope of the following appended claims.

What is claimed is:

1. A multiprocessor distributed, initialize and self-test system for a use in a multiprocessor interconnect, wherein said interconnect includes a back plane bus for connecting multiple central processing units of differing types, memory modules, and other input forward/output modules, said system comprising:

a first central processing unit coupled to said back plane bus, said first central processing unit assigned to boot first upon the system startup;

a second central processing unit coupled to said back plane bus, said second central processing unit not substantially compatible with said first central processing unit;

a first non-volatile semiconductor memory for storing first central processing unit boot instructions in executable form, said first central processing unit executing said boot instructions upon start-up of the multiprocessor system;

a centrally accessible system memory having memory locations of a first width, wherein said centrally accessible system memory is coupled to at least said first central processing unit and said second central processing unit such that at least a first set of instructions stored in said centrally accessible system memory is accessible for execution by said first central processing unit, and at least a second set of instructions stored in said centrally accessible memory is directly accessible for execution by said second central processing unit; and a second non-volatile semiconductor memory, said second non-volatile semiconductor memory having memory locations of a second width which is narrower than said first width, said second non-volatile memory storing initialization and self-test code in a non-executable data format, said initialization and self-test code specific to said second central processing unit, said second non-volatile memory coupled to said second central processing unit and accessible by said first central processing unit, and wherein said first central processing unit transfers said initialization and self-test code directly from said second non-volatile memory as said second set of instructions to said centrally accessible system memory, and configures the initialization and self-test code into initialization and self-test executable instructions having said first width in said centrally accessible system memory for execution by said second central processing unit.

2. The multiprocessor distributed initialize and self-test system of claim 1, wherein said initialization and self-test code stored in non-executable form in said second non-volatile memory is inaccessible until said first central processing unit executes at least a portion of the boot code stored in executable form in said first non-volatile semiconductor memory.

3. The multiprocessor distributed initialize and self test system of claim 1, further comprising a third central processing unit coupled to said backplane bus and substantially compatible with said first central processing unit, said third central processing unit coupled to said first non-volatile memory, said third central processing unit assigned to boot upon system start-up in place of said first central processing unit if said first central processing unit fails to boot.

4. The multiprocessor distributed initialize and self-test system of claim 1, wherein said first width is 32 bits, and wherein said second width is eight bits.

5. The multiprocessor distributed initialize and self-test system of claim 1, wherein said first central processing unit is substantially compatible with INTEL 80486 based central processing units.

6. The multiprocessor distributed initialize and self-test system of claim 5, wherein said second central processing unit is substantially compatible with MOTOROLA 68000 based central processing units.

7. The multiprocessor distributed initialize and self-test system of claim 1, wherein said second processor remains in reset during the transfer by said first central processing unit of said initialization and self-test code stored in said second non-volatile memory.

8. The multiprocessor distributed initialize and self-test system of claim 1, wherein said second non-volatile memory is memory mapped to a predetermined location.

9. A multiprocessor system comprising:

a multiprocessor bus for connecting multiple central processing units;

a first central processing unit coupled to said multiprocessor bus, said first central processing unit assigned to boot first upon the system startup;

a second central processing unit coupled to said multiprocessor bus, said second central processing unit not substantially compatible with said first central processing unit;

a first non-volatile memory accessible in the memory space for multiprocessor system, said first non-volatile memory storing first central processing unit boot instructions in executable form, said first central processing unit executing said boot instructions upon start-up of the multiprocessor system;

a centrally accessible system memory having memory locations of a first width, wherein said centrally accessible system memory is coupled to at least said first central processing unit and said second central processing unit such that at least a first set of instructions stored in said centrally accessible system memory is accessible for execution by said first central processing unit, and at least a second set of instructions is directly accessible for execution by said second central processing unit; and a second non-volatile memory accessible in the memory space of said multiprocessor system, said second non-volatile memory having memory locations of a second width which is narrower than said first width, said second non-volatile memory storing initialization and self-test code in non-executable form, said initialization and self-test code specific to said second central processing unit.

10. The multiprocessor system of claim 1, said second non-volatile memory being coupled to said second central processing unit and accessible by said first central processing unit, and wherein said first central processing unit transfers said initialization and self-test code directly from said second non-volatile memory to said centrally accessible system memory, and configures the initialization and self-test code into initialization and self-test executable instructions having said first width in said centrally accessible system memory for execution by said second central processing unit.

11. A multiprocessor system comprising:

a bus;

a first central processing unit coupled to said bus, said first central processing unit assigned to boot first upon system startup;

a second central processing unit coupled to said bus;

a first non-volatile memory accessible in memory space of the multiprocessor system, said first non-volatile memory storing first central processing unit boot instructions in executable form, said first central processing unit executing said boot instructions upon start-up of said first central processing unit;

a centrally accessible system memory having memory locations, wherein said centrally accessible system memory is coupled to at least said first central processing unit and said second central processing unit such that at least a first set of instructions stored in said centrally accessible system memory is directly accessible for execution by said first central processing unit, and at least a second set of instructions stored in said centrally accessible memory is directly accessible for execution by said second central processing unit; and a second non-volatile memory accessible in the memory space of said multiprocessor system, said second non-volatile memory having memory locations, said second non-volatile memory storing initialization and self-test code in non-executable form, said initialization and self-test code specific to said second central processing unit, said initialization and self-test code transferred from said second non-volatile memory to said centrally accessible memory and converted to an executable format as said second set of instructions.

12. The multiprocessor system of claim 11, wherein said second central processing unit not substantially compatible with said first central processing unit.

13. The multiprocessor system of claim 12, wherein said central accessible system memory locations have a first width and said second non-volatile memory location have a second width narrower than said first width, wherein said central processing unit transfers said initialization and self-test code directly from said second non-volatile memory to said centrally accessible system memory, and configures the initialization and self-test code into initialization and self-test executable instructions having said first width in said centrally accessible system memory for execution by said second central processing unit.

14. The multiprocessor system of claim 13, wherein said first width is 32 bits, and wherein said second width is eight bits.

15. The multiprocessor system of claim 11, wherein said initialization and self-test code stored in non-executable form in said second non-volatile memory is inaccessible until said first central processing unit executes at least a portion of the boot code stored in executable form in said first non-volatile semiconductor memory.

16. The multiprocessor system of claim 11, further comprising a third central processing unit coupled to said backplane bus, said third central processing unit coupled to said first non-volatile memory, said third central processing unit assigned to boot upon system start-up in place of said first central processing unit if said first central processing unit fails to boot.

17. The multiprocessor system of claim 11, wherein said first central processing unit is substantially compatible with INTEL 80486 based central processing units.

18. The multiprocessor system of claim 17, wherein said second central processing unit is substantially compatible with MOTOROLA 68000 based central processing units.

19. The multiprocessor system of claim 11, wherein said second processor remains in reset during the transfer by said first central processing unit of said initialization and self-test code stored in said second non-volatile memory.

20. The multiprocessor distributed initialize and self-test system of claim 11, wherein said second non-volatile memory is memory mapped to a predetermined location.

21. A multiprocessor system comprising:

a bus;

a first central processing unit coupled to said bus, said first central processing unit assigned to boot first upon system startup;

a second central processing unit coupled to said bus;

a first non-volatile memory accessible in memory space of the multiprocessor system, said first non-volatile memory storing boot instructions in executable form, said first central processing unit executing said boot instructions upon start-up of said first central processing unit;

a second non-volatile memory, said second non-volatile memory storing initialization and self-test code specific to said first central processing unit;

a centrally accessible system memory having memory locations, wherein said centrally accessible system memory is coupled to at least said first central processing unit and said second central processing unit such that at least a first set of instructions configured from said code from said second non-volatile memory and stored in said centrally accessible system memory is accessible for execution by said first central processing unit, and at least a second set of instructions stored in said centrally accessible memory is directly accessible for execution by said second central processing unit; and a third non-volatile memory, said third non-volatile memory storing initialization and self-test code in non-executable form, said initialization and self-test code specific to said second central processing unit in a non-executable data format, said third non-volatile memory coupled to said second central processing unit and accessible by said first central processing unit, and wherein said first central processing unit transfers said initialization and self-test code from said third non-volatile memory to said centrally accessible system memory, and configures the initialization and self-test code into executable initialization and self-test instructions in said centrally accessible system memory for execution by said second central processing unit.

22. A multiprocessor system as defined in claim 21 wherein said first non-volatile memory is accessible by said second central processing unit.

23. A multiprocessor system as defined in claim 22, wherein said boot instructions are common to both said first central processing unit and said second central processing unit.

* * * * *